US007565044B2

United States Patent
Akahoshi et al.

(10) Patent No.: US 7,565,044 B2
(45) Date of Patent: Jul. 21, 2009

(54) OPTICAL MODULE METHOD OF MANUFACTURING THE SAME

(75) Inventors: Tomoyuki Akahoshi, Kawasaki (JP); Akio Sugama, Kawasaki (JP); Shigenori Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/034,063

(22) Filed: Feb. 20, 2008

(65) Prior Publication Data
US 2008/0199129 A1      Aug. 21, 2008

(30) Foreign Application Priority Data
Feb. 20, 2007    (JP) .............................. 2007-039807

(51) Int. Cl.
*G02B 6/26*      (2006.01)
(52) U.S. Cl. .............................. 385/16; 385/129; 385/14
(58) Field of Classification Search .................. 385/16, 385/9, 14, 24, 31, 129–132
See application file for complete search history.

(56) References Cited

U.S. PATENT DOCUMENTS

| | | | |
|---|---|---|---|
| 6,504,966 B2 * | 1/2003 | Kato et al. ..................... | 385/16 |
| 7,043,111 B2 * | 5/2006 | Ikarashi et al. ................ | 385/16 |
| 7,229,219 B2 * | 6/2007 | Lee et al. ...................... | 385/91 |
| 2003/0152329 A1 * | 8/2003 | Sugama et al. ................ | 385/50 |
| 2003/0179976 A1 * | 9/2003 | Kato et al. ..................... | 385/8 |
| 2006/0088240 A1 * | 4/2006 | Aoki et al. ..................... | 385/9 |

FOREIGN PATENT DOCUMENTS

| | | |
|---|---|---|
| JP | 2002-318398 A | 10/2002 |
| JP | 2004-037704 A | 2/2004 |
| JP | 2005-266638 A | 9/2005 |

* cited by examiner

*Primary Examiner*—Ellen Kim
(74) *Attorney, Agent, or Firm*—Westerman, Hattori, Daniels & Adrian, LLP.

(57) ABSTRACT

An optical module with a first optical waveguide substrate having end faces; a second optical waveguide substrate which includes a first optical waveguide, a second optical waveguide, and end faces, the second optical waveguide substrate having an opening between the first optical waveguide and the second optical waveguide; and a first deflection device which is mounted in the opening, wherein one of the end faces of the first optical waveguide substrate and one of the end faces of the second optical waveguide substrate are coupled to each other.

18 Claims, 6 Drawing Sheets

FIG. 7D

OPTICAL MODULE METHOD OF MANUFACTURING THE SAME

CROSS-REFERENCE TO RELATED APPLICATIONS

This application is based upon and claims the benefit of priority from the prior Japanese Patent Application No. 2007-039807, filed on Feb. 20, 2007, the entire content of which is incorporated herein by reference.

TECHNICAL FIELD

The present invention relates to an optical module used in optical communication and a method of manufacturing the same.

BACKGROUND

Recently, there is proposed an optical switch module in which a deflection element having an electro-optic effect is used (see, for example, Japanese Patent Application Laid-Open (JP-A) No. 2002-318398. In such optical switch modules, as shown in FIG. 1, deflection elements 101 and 102 made of an electro-optic material (for example, electro-optic crystal such as PZT and PLZT) are mounted on a slab optical waveguide substrate 100.

Figure 1:
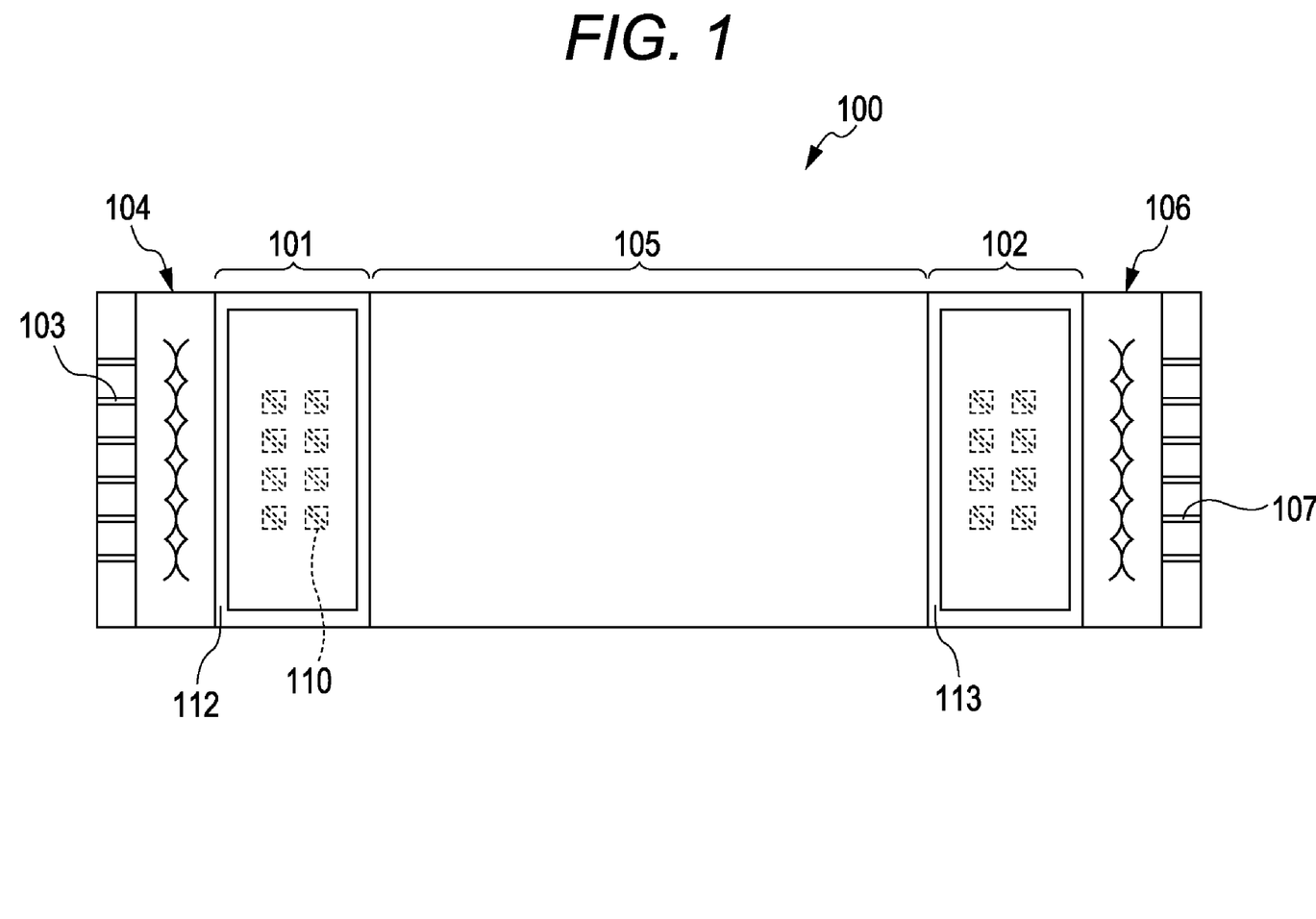
FIG. 1 is a plan view showing a schematic configuration of a conventional optical switch module.

That is, as shown in FIG. 1, the slab optical waveguide substrate 100 is configured by integrally forming an input-channel optical waveguide (input-channel optical waveguide array) 103 to which an optical signal is inputted, a plural collimator lenses (input-side lens array) 104 which forms the inputted optical signal in parallel light (collimated light), a slab optical waveguide 105 through which the optical signal formed in the parallel light propagates, a plural collective lenses (output-side lens array) 106 which collects the optical signal propagating formed in the parallel light, and an output-channel optical waveguide (output-channel optical waveguide array) 107 which outputs the optical signal. In the slab optical waveguide substrate 100, first and second deflection element mounting openings 112 and 113 are also formed to mount the deflection elements 101 and 102.

As to production of the input-side deflection element (first deflection element array) 101 and the output-side deflection element (second deflection element array) 102, thin-film slab optical waveguides made of electro-optic materials (for example, electro-optic crystal such as PZT and PLZT) are formed on conductive substrates, prism-shaped electrodes 110 are formed on surfaces of the thin-film slab optical waveguides, and end faces are polished to complete the input-side and output-side deflection elements 101 and 102. In the optical switch module, the input-side deflection element 101 is mounted on the first deflection element mounting opening 112 between the plural collimator lenses 104 and slab optical waveguide 105 on the slab optical waveguide substrate 100, and the output-side deflection element 102 is mounted on the second deflection element mounting opening 113 between the slab optical waveguide 105 and the plural collective lenses 106.

In the optical switch module having the configuration of FIG. 1, when desired voltages are applied to the prism-shaped electrodes 110 formed in the input-side and output-side deflection elements 101 and 102, the optical signal which is inputted from the input-channel optical waveguide 103 and formed in the parallel light by the plural collimator lenses 104 is deflected by the input-side deflection element 101 to propagate through the slab optical waveguide 105, the optical signal is deflected by the output-side deflection element 102 again and collected by the plural collective lenses 106, and the optical signal is coupled to a desired output-channel optical waveguide 107. Therefore, a path of the optical signal outputted from the input-channel optical waveguide 103 is switched and outputted from the desired output-channel optical waveguide 107.

Additionally, Japanese Patent Application Laid-Open (JP-A) No. 2004-37704 proposes a structure of an optical switch module which can reduce the number of channels and production costs. However, in the conventional techniques, aligning in active alignment is hardly performed with high accuracy.

SUMMARY

An optical module according to an aspect of the present invention includes an optical waveguide substrate and an optical waveguide substrate having a first optical waveguide and a second optical waveguide, a deflection element being mounted between the first optical waveguide and the second optical waveguide.

DETAILED DESCRIPTION

Figure 2A:
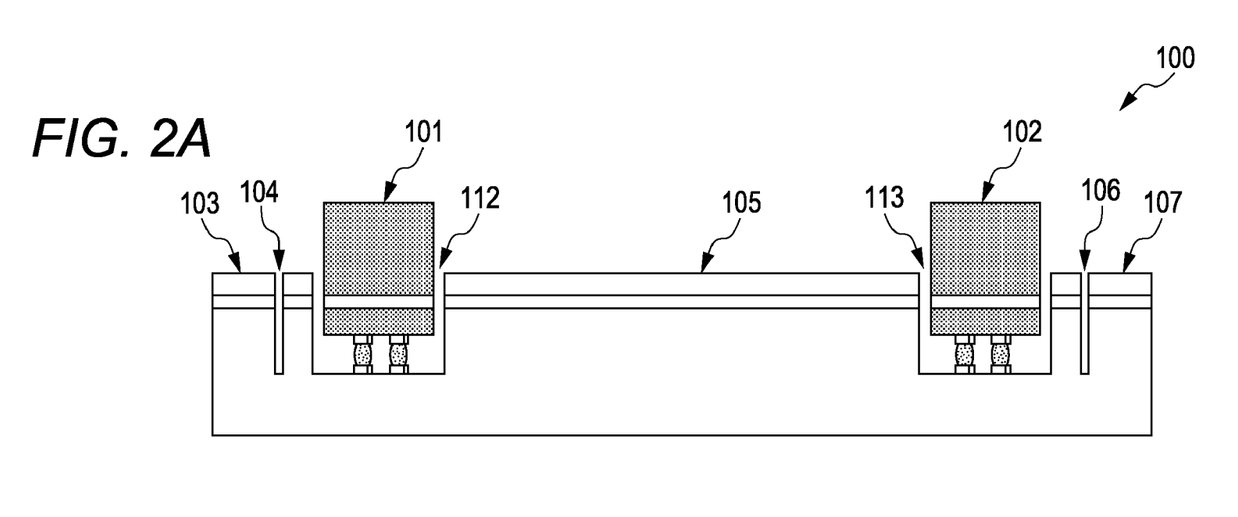
FIGS. 2A and 2B are schematic diagrams explaining a method of manufacturing an optical switch module.

As shown in FIG. 2A, the first deflection element array 101 and the second deflection element array 102 are produced, while the slab optical waveguide substrate 100 is produced by integrally forming the input-channel optical waveguide 103, the input-side lens array 104, the first deflection element mounting opening 112, the slab optical waveguide 105, the second deflection element mounting opening 113, the output-side lens array 106, and the output-channel optical waveguide 107. Then, the first and second deflection element arrays 101 and 102 are sequentially mounted on the deflection element mounting openings 112 and 113 of the slab optical waveguide substrate 100.

As shown in FIG. 2A, in order to mount the deflection element arrays 101 and 102 on the slab optical waveguide substrate 100, the active alignment is performed while intensity of output light is monitored. When the light (monitor light; propagation light) propagating through the slab optical waveguide is misaligned from a predetermined traveling direction, the propagation light is not coupled to the output-channel optical waveguide 107 nor is adjusted the position of the output-side lens array (collective lens array) 106, so that the first and second deflection element arrays 101 and 102 is hardly aligned by the active alignment.

Figure 2B:
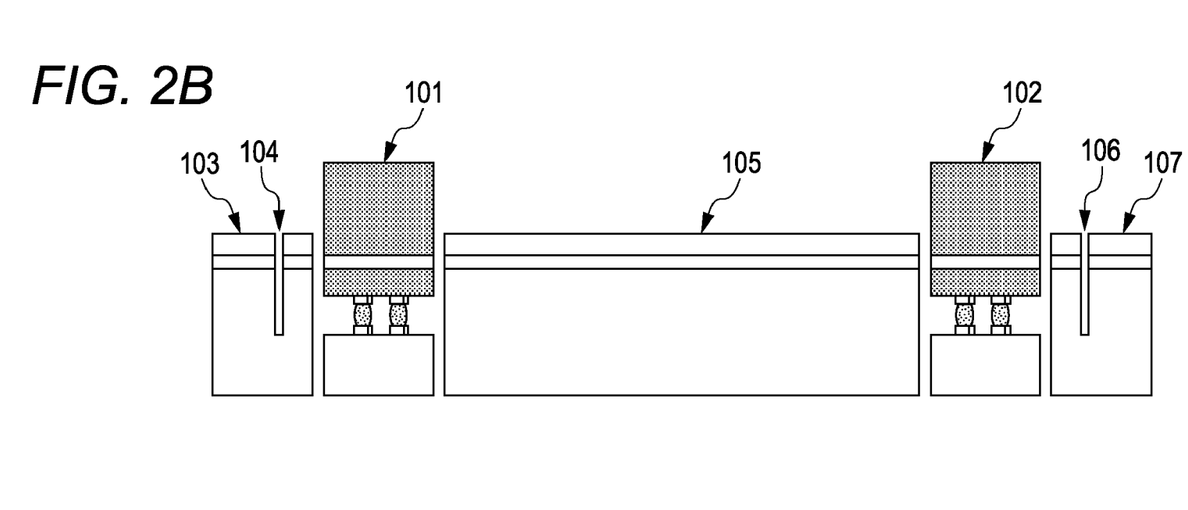

Examples of the angle misalignment of the propagation light include accuracy of polishing of the deflection element, crystalline characteristics of the deflection element (unevenness of thickness and unevenness of refractive index) and the like. In the example of FIG. 2B, components constituting the optical switch module, i.e., a component in which the input-channel optical waveguide array 103 and the input-side lens array 104 are formed, a component in which the first deflection element array 101 is mounted, a component in which the slab optical waveguide 105 is formed, a component in which the second deflection element array 102 is mounted, and a component in which the output-side lens array 106 and the output-channel optical waveguide array 107 are formed are separately prepared, and the components are sequentially coupled by the butt joint to produce the optical switch module.

Figure 3:
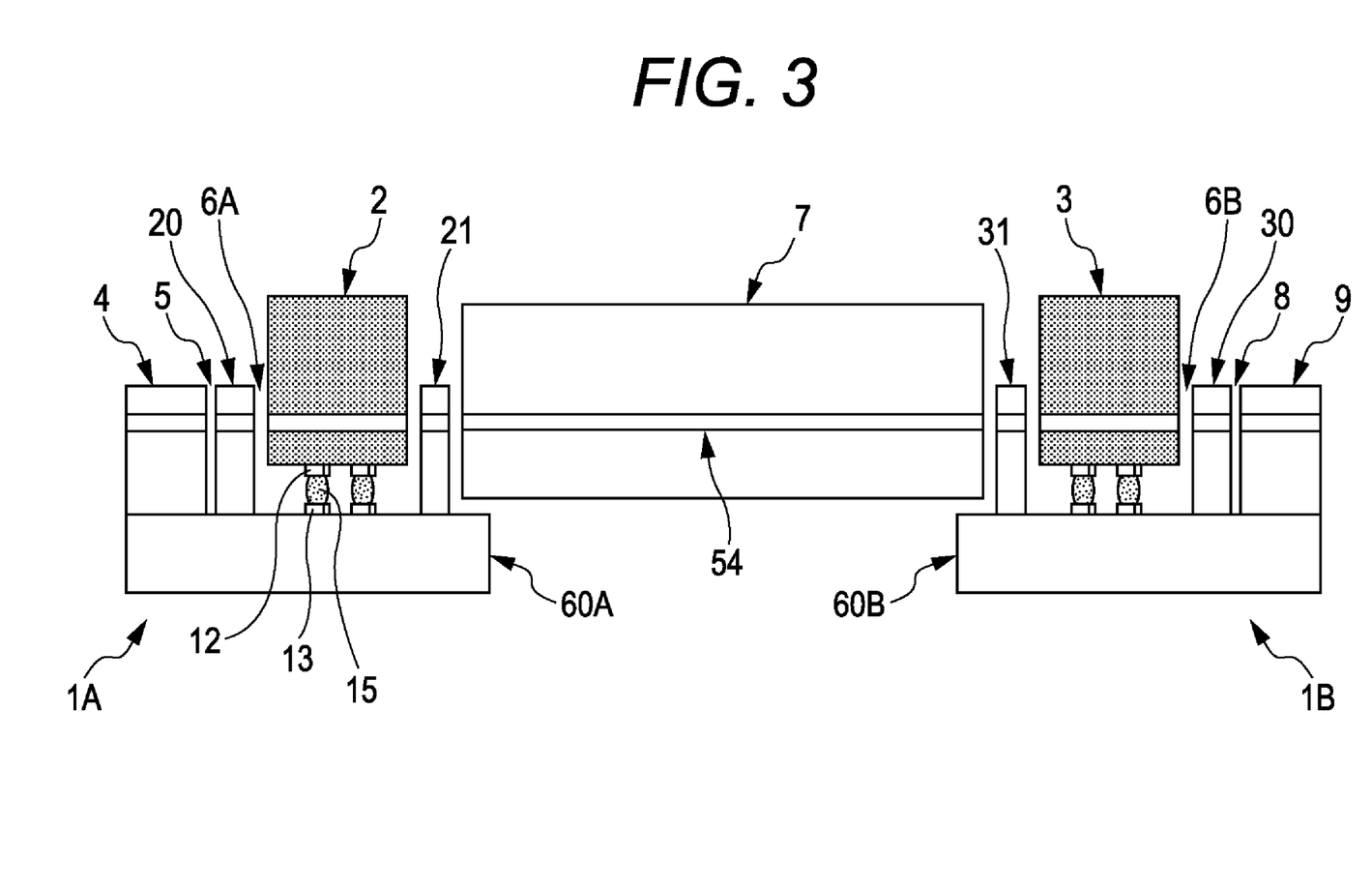
FIG. 3 is a sectional view schematically showing an entire configuration of an optical module according to an embodiment of the invention.

In such a manufacturing method, the temporal misalignment is possibly generated in each coupled portion to deteriorate characteristics of the optical switch module. In particular, when the number of coupled points is increased, the deterioration of the characteristics is easily generated by the temporal misalignment in each coupled portion. As shown in FIG. 3, an optical module according to an embodiment of the invention is formed as an optical switch module which includes input-side and output-side optical waveguide substrates 1A and 1B, a slab optical waveguide substrate 7 having a slab optical waveguide, and input-side and output-side deflection element arrays 2 and 3 including plural deflection elements having electro-optic effects.

Figure 4:
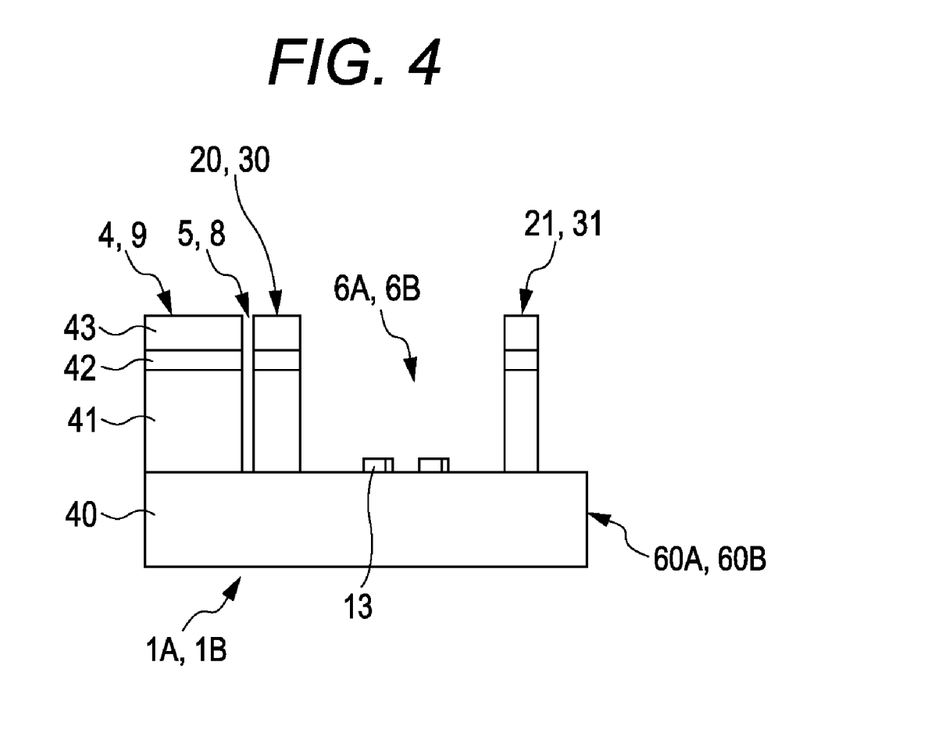
FIG. 4 is a sectional view schematically showing an optical waveguide substrate constituting the optical module of the embodiment.

In the optical waveguide substrate 1A (1B), as shown in FIG. 4, plural channel optical waveguides 4 (9) connected to the optical fiber, plural lenses (lens array) 5 (8), a slab optical waveguide 20 (30), an element mounting opening (recess; fitting groove) 6A (6B) mounting the deflection element array 2 (3), and a slab optical waveguide 21 (31) are formed in the same substrate.

The plural channel optical waveguides 4 (9) and the slab optical waveguide 20 (30) (first optical waveguide; incident optical waveguide) guide the light incident to the deflection element array 2 (3) mounted on the element mounting opening 6A (6B). The slab optical waveguide 21 (31) (second optical waveguide; outgoing optical waveguide) guides the light outgoing from the deflection element array 2 (3) mounted on the element mounting opening 6A (6B). The element mounting opening 6A (6B) is located between the slab optical waveguides 20 (30) and 21 (31). In the optical waveguide substrate 1A (1B), the lens array 5 (8) is located between the plural channel optical waveguides 4 (9) and the slab optical waveguide 20 (30).

The optical waveguide substrate 1A (1B) includes a projection 60A (60B) projected from an end face of the slab optical waveguide 21 (31). As described later, the slab optical waveguide substrate 7 is disposed on the projection 60A (60B), which allows alignment accuracy to be improved in coupling the optical waveguide substrate 1A (1B) and the slab optical waveguide substrate 7.

In the optical waveguide substrate (input-side optical waveguide substrate) 1A of the embodiment, as shown in FIG. 3, the plural input-channel optical waveguides (input-channel optical waveguide array) 4, the plural collimator lenses (input-side lens array) 5, the slab optical waveguide 20, the input-side element mounting opening 6A, the slab optical waveguide 21 are formed on the same substrate. The plural input-channel optical waveguides 4 are connected to input optical fibers constituting an input fiber array (not shown), an optical signal is inputted from each input optical fiber, and the optical signal (input light) is guided to the input-side deflection element array 2 disposed in the input-side element mounting opening 6A.

The plural collimator lenses 5 are disposed opposite each of the input-channel optical waveguides 4 (for example, see FIG. 3). The plural collimator lenses 5 converts the optical signal (input light) guided through the plural input-channel optical waveguides 4 into collimated light (parallel light). That is, the light outgoing radially from the input-channel optical waveguide 4 is converted into the parallel light by the plural collimator lenses 5, and the parallel light is incident to each input-side deflection element constituting the input-side deflection element array 2.

In the optical waveguide substrate (output-side optical waveguide substrate) 1B, as shown in FIG. 3, the slab optical waveguide 31, the output-side element mounting opening 6B, the slab optical waveguide 30, the plural collective lenses (output-side lens array) 8, the plural output-channel optical waveguides (output-channel optical waveguide array) 9 are formed on the same substrate. The plural collimator lenses 8 are disposed opposite each of the output-channel optical waveguides 9 (for example, see FIG. 3). The plural collective lenses 8 collects the collimated light whose propagation direction is changed by each output-side deflection element of the output-side deflection element array 3 disposed in the output-side element mounting opening 6B, and the collimated light is imaged on each output-channel optical waveguide 9.

Each of the plural output-channel optical waveguides 9 is connected to each output optical fiber constituting an output fiber array (not shown), and the light collected by each of the plural collective lenses 8 is guided to each output optical fiber. That is, the optical signal is imaged on the output-channel optical waveguide 9 by each of the plural collective lenses 8, the optical signal propagates through each output-channel optical waveguide 9, and the optical signal is outputted to each output optical fiber.

The number of input-channel optical waveguides 4 of the optical waveguide substrate 1A may be equal to the number of output-channel optical waveguides 9 of the optical waveguide substrate 1B, or the number of input-channel optical waveguides 4 of the optical waveguide substrate 1A may be different from the number of output-channel optical waveguides 9 of the optical waveguide substrate 1B. In the embodiment, the input-side optical waveguide substrate 1A includes the input-channel optical waveguide 4 and the output-side optical waveguide substrate 1B includes the output-channel optical waveguide 9. However the invention is not limited to the configuration of the embodiment. For example, the input fiber array may be connected to the region where the lens array (plural collimator lenses) 5 is provided while the input-side optical waveguide substrate 1A is formed without the input-channel optical waveguide 4, and the output fiber array may be connected to the region where the plural collimator lenses 8 is provided while the output-side optical waveguide substrate 1B is formed without the output-channel optical waveguide 9.

The input-side deflection element array 2 including the plural deflection elements is mounted in the element mounting opening 6A of the input-side optical waveguide substrate 1A as shown in FIG. 3. That is, the input-side deflection element array 2 is coupled to an end face (constituting a wall surface of the element mounting opening 6A) of the slab optical waveguide 20 and an end face (constituting a wall surface of the element mounting opening 6A) of the slab optical waveguide 21.

Figure 6A:
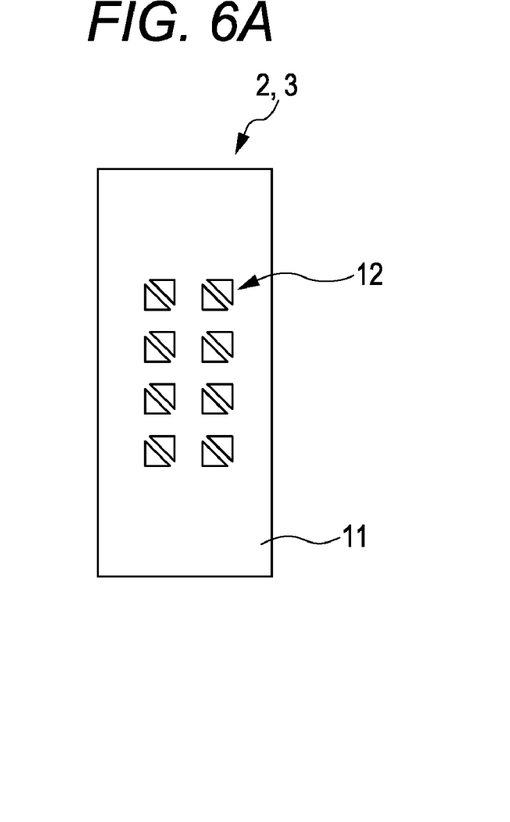
FIGS. 6A and 6B are schematic diagrams showing a deflection element array constituting the optical module of the embodiment.
Figure 6B:
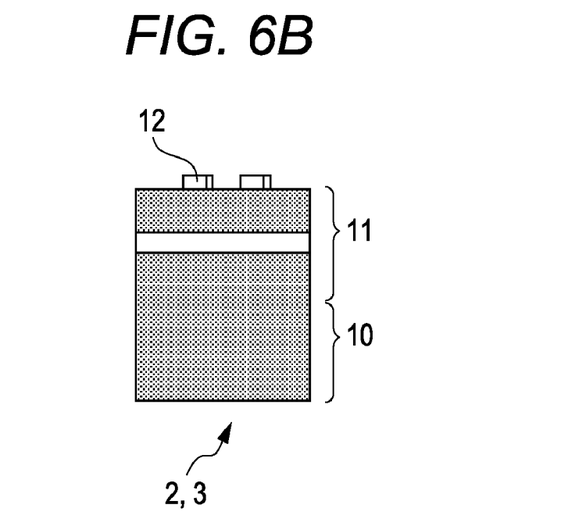

Each input-side deflection element constituting the input-side deflection element array 2 is provided opposite each input-channel optical waveguide 4 and each collimator lens (for example, see FIG. 3). In the input-side deflection element array 2, as shown in FIGS. 6A and 6B, a slab optical waveguide 11 made of a material (in this case, PLZT) having an electro-optic effect is formed on a conductive substrate 10 (in this case, a Nb—STO substrate) which is of an upper electrode, and one or plural pairs of prism-shaped electrodes 12 which are of a lower electrode are serially provided in each channel (each port) in a surface of the slab optical waveguide 11.

Similarly to the input-side deflection element array 2, the output-side deflection element array 3 including the plural deflection elements is mounted in the element mounting opening 6B of the output-side optical waveguide substrate 1B as shown in FIG. 3. That is, the output-side deflection element array 3 is coupled to an end face (constituting a wall surface of the element mounting opening 6B) of the slab optical waveguide 31 and an end face (constituting a wall surface of the element mounting opening 6B) of the slab optical waveguide 30.

Each output-side deflection element constituting the output-side deflection element array 3 is provided opposite each output-channel optical waveguide 9 and each collective lens (for example, see FIG. 3). Similarly to the input-side deflection element array 2, in the output-side deflection element array 3, as shown in FIGS. 6A and 6B, the slab optical waveguide 11 made of a material having the electro-optic effect is formed on the conductive substrate 10 which is of the upper electrode, and the one or plural pairs of prism-shaped electrodes 12 which are of the lower electrode are serially provided in each channel (each port) in the surface of the slab optical waveguide 11.

On the other hand, as shown in FIG. 3, in a bottom surface of the element mounting opening 6A (6B) of each optical waveguide substrate 1A (1B), an electrode pad 13 is provided opposite the prism-shaped electrode 12 disposed in the deflection element array 2 (3) mounted in the element mounting opening 6A (6B). Electric wiring (not shown) is connected to the electrode pad 13. The prism-shaped electrode 12 of the deflection element array 2 (3) and the electrode pad 13 of the element mounting opening 6A (6B) of the slab optical waveguide substrate 1A (1B) are connected by an electrically-conductive paste (metal paste such as silver paste; electrically-conductive adhesive) 15 as shown in FIG. 3.

Using the upper electrode 10 and the lower electrode 12, a voltage is applied to the slab optical waveguide 11 to change a refractive index of the slab optical waveguide 11 through the electrode pad 13 (and the electric wiring (not shown)) formed in the bottom surface of the element mounting opening 6A (6B) of the slab optical waveguide substrate 1A (1B). This enables the electro-optic effect to be utilized to change the propagation direction of the optical signal.

Figure 5:
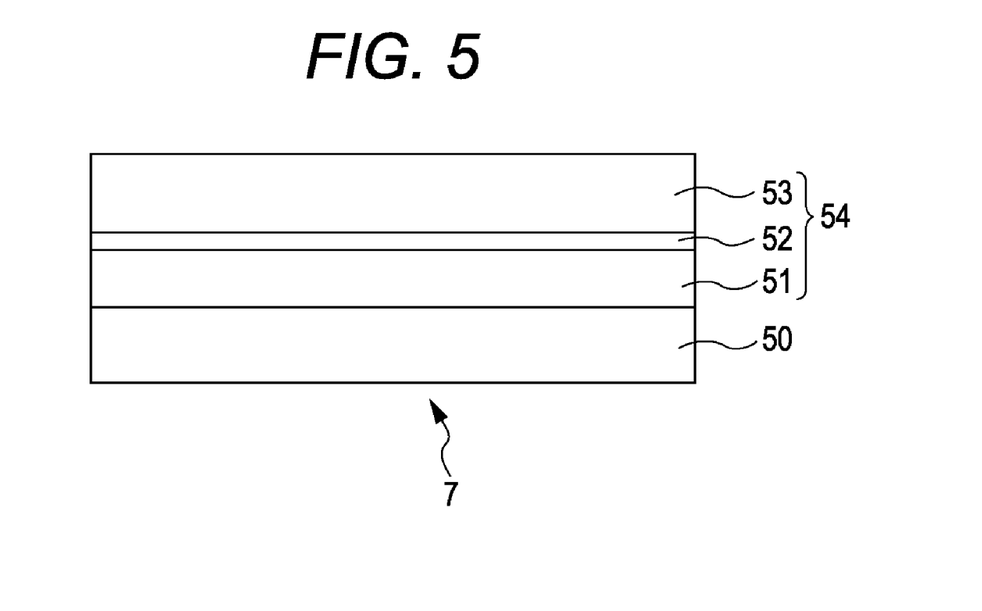
FIG. 5 is a sectional view schematically showing a slab optical waveguide substrate constituting the optical module of the embodiment.

The slab optical waveguide substrate 7 includes a slab optical waveguide (common optical waveguide) through which all the optical signals may propagate commonly. That is, as shown in FIG. 5, the slab optical waveguide substrate 7 includes a slab optical waveguide 54. In the slab optical waveguide 54, a lower cladding layer 51 made of, for example, quartz, a core layer 52 made of, for example, quartz in which the refractive index is adjusted by doping gallium Ga, and an upper cladding layer 53 made of, for example, quartz are sequentially formed on a silicon substrate (or quartz substrate; quartz wafer) 50.

In the embodiment, as shown in FIG. 3, the optical waveguide substrates 1A and 1B are coupled (rigidly bonded) to both end faces of the slab optical waveguide substrate 7 by an optical adhesive (bonding agent made of an optical material; agent having high light transmittance). That is, in order that the light outgoing from the end face of the slab optical waveguide (second optical waveguide) 21 of the incident-side optical waveguide substrate 1A is incident to one of end faces of the slab optical waveguide 54 of the slab optical waveguide substrate 7, the end face of the slab optical waveguide (second optical waveguide) 21 of the incident-side optical waveguide substrate 1A and one of end faces of the slab optical waveguide 54 of the slab optical waveguide substrate 7 are coupled so as to face to each other.

In order that the light outgoing from the other end face of the slab optical waveguide 54 of the slab optical waveguide substrate 7 is incident to the end face of the slab optical waveguide (second optical waveguide) 31 of the outgoing-side optical waveguide substrate 1B, the end face of the slab optical waveguide (second optical waveguide) 31 of the outgoing-side optical waveguide substrate 1B and the other end face of the slab optical waveguide 54 of the slab optical waveguide substrate 7 are coupled so as face to each other.

In the embodiment, as shown in FIG. 3, the slab optical waveguide substrate 7 is provided on the projections 60A and 60B of the optical waveguide substrates 1A and 1B. That is, while the end face of the slab optical waveguide (second optical waveguide) 21 of the incident-side optical waveguide substrate 1A and one of end faces of the slab optical waveguide 54 of the slab optical waveguide substrate 7 are coupled (rigidly bonded) to each other, an upper surface of the projection 60A of the incident-side optical waveguide substrate 1A and a lower surface on one of end face sides of the slab optical waveguide substrate 7 are coupled (rigidly bonded) to each other.

While the end face of the slab optical waveguide (second optical waveguide) 31 of the outgoing-side optical waveguide substrate 1B and the other end face of the slab optical waveguide 54 of the slab optical waveguide substrate 7 are coupled (rigidly bonded) to each other, an upper surface of the projection 60B of the outgoing-side optical waveguide substrate 1B and a lower surface on the other end face side of the slab optical waveguide substrate 7 are coupled (rigidly bonded) to each other. Thus, the propagation direction of the optical signal is changed by the input-side deflection element constituting the input-side deflection element array 2 mounted in the element mounting opening 6A of the input-side optical waveguide substrate 1A, the slab optical waveguide substrate 7 is provided between the input-side optical waveguide substrate 1A including the element mounting opening 6A and the output-side optical waveguide substrate 1B including the element mounting opening 6B, and the optical signal is guided to the output-side deflection element constituting the output-side deflection element array 3 mounted in the element mounting opening 6B of the output-side optical waveguide substrate 1B by the slab optical waveguide 54 of the slab optical waveguide substrate 7.

In the optical switch module having the above-described configuration, a path of the optical signal inputted into the input-channel optical waveguide 4 can be switched and the optical signal can be outputted from the output-channel optical waveguide 9 by controlling the voltage applied to the input-side deflection element constituting the input-side deflection element array 2 and the output-side deflection element constituting the output-side deflection element array 3.

In the optical switch module of the embodiment, the propagation direction of the optical signal inputted from the input-channel optical waveguide 4 is changed by the input-side deflection element constituting the input-side deflection element array 2, the propagation direction of the optical signal propagating through the slab optical waveguide 7 is changed again by the output-side deflection element constituting the output-side deflection element array 3, and the optical signal is imaged on the output-channel optical waveguide 9 through the collective lens.

A method of manufacturing an optical module (optical switch module) according to an embodiment of the invention will be described below. A method of manufacturing an optical waveguide substrate, a method of manufacturing a slab optical waveguide substrate, and a method of manufacturing a deflection element array, and a method of manufacturing an optical module (optical switch module) will sequentially be described.

(A Method of Manufacturing an Optical Waveguide Substrate)

As shown in FIG. 4, the quartz is deposited on a silicon substrate (or quartz substrate; quartz wafer) 40 to form a lower cladding layer 41 by a thermal oxidation method or an MOCVD method. Alternatively, a quartz substrate also used as the lower cladding layer may be used.

The quartz whose refractive index is adjusted by doping, for example, gallium Ga is deposited on the lower cladding layer 41 to form a core layer 42 by the MOCVD method. Then, the core layer 42 is patterned in a channel shape by dry etching such as RIE. The quartz is deposited on the core layer 42 to form an upper cladding layer 43 by the same method as the method for forming the lower cladding layer 41. Therefore, the plural channel optical waveguides 4 (9) and the slab optical waveguide are formed on the silicon substrate 40.

After the quartz optical waveguide including the plural channel optical waveguides 4 (9) and the slab optical waveguide is prepared, the slab optical waveguide formed in the lens region (collimator lens region or collective lens region) is processed by the dry etching such as RIE, and the slab optical waveguide formed in the region where the deflection element array 2 (3) is mounted is removed to form the element mounting opening 6A (6B) while the lens array 5 (8) including the plural lens is formed.

Particularly, in the embodiment, as shown in FIG. 4, the element mounting opening 6A (6B) is formed such that the slab optical waveguides 20 (30) and 21 (31) remain on both sides thereof. That is, the end face of the slab optical waveguide 21 (31) is partially removed by the dry etching such as RIE while the lens array 5 (8) or the element mounting opening 6A (6B) is formed, in order that the projection 60A (60B) is formed in the optical waveguide substrate 1A (1B) by projecting the end portion of the substrate 40 constituting the optical waveguide substrate 1A (1B) from the end face of the slab optical waveguide 21 (31) formed on the substrate 40.

Then, a metal film is deposited on the bottom surface of the element mounting opening 6A (6B) to form the electrode pad 13 (and electric wiring connected to the electrode pad 13) by sputtering or plating. A groove portion constituting the lens array 5 (8) processed by, for example, RIE may be filled with a material (lens filler) having a refractive index lower than that of the core layer.

The silicon substrate 40 is cut in predetermined dimensions to polish the end face on the side of the channel optical waveguide 4 (9) of each optical waveguide substrate 1A (1B). Polishing the end face of the slab optical waveguide 21 (31) may not be performed because the end face of the slab optical waveguide 21 (31) is formed by the dry etching such as RIE. Thus, the optical waveguide substrate 1A (1B) is prepared while the plural channel optical waveguides 4 (9), the plural lenses 5 (8), the slab optical waveguide 20 (30), the one element mounting opening 6A (6B), and the slab optical waveguide 21 (31) are integrally formed on the same substrate. The optical waveguide substrate 1A (1B) has the element mounting opening 6A (6B) between the slab optical waveguide (first optical waveguide) 20 (30) and the slab optical waveguide (second optical waveguide) 21 (31).

In the embodiment, the optical waveguide substrate 1A (1B) is made of the quartz. The invention is not limited to the quartz, but the optical waveguide substrate may be includes a polymer waveguide in which an optical polymer (for example, OPI series (product of Hitachi Chemical Co., Ltd.)) is used. That is, the optical waveguide substrate 1A (1B) may differ from the slab waveguide substrate 7 in the material.

(A Method of Manufacturing a Slab Optical Waveguide Substrate)

As shown in FIG. 5, the quartz is deposited on a silicon substrate (or quartz substrate; quartz wafer) 50 to form a lower cladding layer 51 by the thermal oxidation method or the MOCVD method. Alternatively, a quartz substrate also used as the lower cladding layer may be used.

The quartz whose refractive index is adjusted by doping, for example, gallium Ga is deposited on the lower cladding layer 51 to form a core layer 52 by, for example, the MOCVD method. Then, the quartz is deposited on the core layer 52 to form an upper cladding layer 53 by, for example, the same method as the method for forming the lower cladding layer 51. Therefore, the slab optical waveguide 54 including the lower cladding layer 51, the core layer 52, and the upper cladding layer 53 is formed.

The silicon substrate 50 is cut in predetermined dimensions, and both the end faces (cutting surface) is polished to prepare the slab optical waveguide substrate 7.

(A Method of Manufacturing a Deflection Element Array)

As shown in FIG. 6B, for example, PLZT ($Pb_xLa_{1-x}(Zr_yTi_{1-y}O_3)$) is deposited on a $SrTiO_3$ substrate (conductive substrate; Nb—STO substrate; may functioning as an electrode), in which niobium Nb is doped to impart conductivity, to form a lower cladding layer (PLZT thin film) by a sol-gel method, a PLD method (pulsed laser deposition method), or an MOCVD method.

Then, for example, PZT ($Pb(Zr_yTi_{1-y}O_3)$) or PLZT whose refractive index is increased by changing a composition is deposited on the lower cladding layer to form a core layer (PLZT thin film) by the similar manner. PLZT having the same composition as the lower cladding layer is deposited on the core layer to form the upper cladding layer (PLZT thin film).

After the slab optical waveguide (PLZT optical waveguide) 11 is made of the material having the electro-optic effect, as shown in FIG. 6A, a metal film is formed in a prism shape on the surface of the upper cladding layer by the sputtering method and photolithography, and the one or plural pairs of prism-shaped electrodes 12 are formed in series. Then, the slab optical waveguide 11 is polished and formed in predetermined dimensions and an anti-reflection coating (AR coating) treatment is performed to the polished end face. Therefore, the deflection element array 2 (3) including the plural deflection elements is manufactured.

(A Method of Manufacturing Optical Module (Optical Switch Module))

Figure 7A:
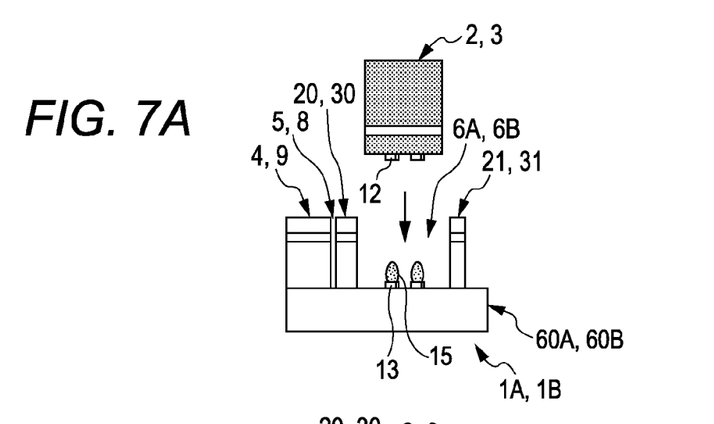
FIGS. 7A to 7D are sectional views schematically showing a method of manufacturing an optical switch module according to an embodiment of the invention.
Figure 7B:
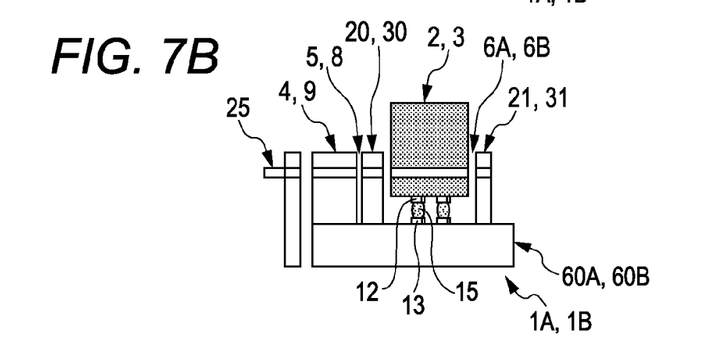

As shown in FIGS. 7A and 7B, the deflection element array 2 (3) is rigidly bonded to the element mounting opening 6A (6B) of the optical waveguide substrate 1A (1B) which is manufactured in the above mentioned manner while fitted in the element mounting opening 6A (6B), which enables the deflection element array 2 (3) to be mounted on the optical waveguide substrate 1A (1B) (deflection element mounting process).

In the embodiment, in mounting the deflection element array 2 (3) on the optical waveguide substrate 1A (1B), positioning (alignment) of the optical waveguide substrate 1A (1B) and the deflection element array 2 (3) is performed with each other as follows. As shown in FIGS. 7A and 7B, the electrically-conductive paste 15 (electrically-conductive adhesive; silver paste such as TB3301 (product of ThreeBond Co., Ltd)) is applied onto the electrode pad 13 formed in the element mounting opening 6A (6B) of the optical waveguide substrate 1 using a dispenser.

Then, as shown in FIG. 7B, the fiber array 25 is brought close to the channel optical waveguide 4 (9) of the optical waveguide substrate 1A (1B) to perform the alignment such that the light from the light source is incident to the channel optical waveguide 4 (9) through the fiber array 25, and the fiber array 25 and the channel optical waveguide 4 (9) are retained while kept in the aligned state. As shown in FIG. 7B, the deflection element array 2 (3) is disposed in the element mounting opening 6A (6B) of the optical waveguide substrate 1A (1B).

Specifically, as shown in FIG. 7B, after the deflection element array 2 (3) fixed to a suction tool head is moved immediately above the element mounting opening 6A (6B) using an automatic stage, the deflection element array 2 (3) is slowly lowered and the deflection element array 2 (3) is inserted into the element mounting opening 6A (6B) of the optical waveguide substrate 1A (1B) while the side of the prism-shaped electrode 12 is faced down. At this point, the prism-shaped electrode 12 of the deflection element array 2 (3) is in contact with the electrically-conductive adhesive 15 applied onto the electrode pad 13.

The deflection element array 2 (3) is aligned in the element mounting opening 6A (6B) of the optical waveguide substrate 1A (1B). As shown in FIG. 7B, alignment light (monitor light) is caused to impinge onto the channel optical waveguide (first optical waveguide) 4 (9) through the fiber array 25. Then, the active alignment is performed such that intensity of the outgoing light becomes the maximum, while the light (optical signal) which is outputted from the end face of the slab optical waveguide (second optical waveguide) 21 (31) through the channel optical waveguide 4 (9), the lens array 5 (8), the slab optical waveguide 20 (30), the deflection element array 2 (3), and the slab optical waveguide 21 (31) is monitored with an optical power meter or an infrared camera, and the optical waveguide substrate 1A (1B) and the deflection element array 2 (3) are aligned with each other to determine a mounting position.

As shown in FIG. 7B, the electrically-conductive adhesive 15 is hardened to connect the electrode 12 of the deflection element array 2 (3) and the electrode pad 13 of the element mounting opening 6A (6B) of the optical waveguide substrate 1A (1B). Then, the element mounting opening 6A (6B) is filled with a bonding agent (for example, optical adhesive such as GA700H (product of NTT-AT)) such as an ultraviolet curing resin (UV resin) and a thermo-curing resin, and the bonding agent is hardened to rigidly bond the deflection element array 2 (3) to the element mounting opening 6A (6B) of the optical waveguide substrate 1A (1B).

In the embodiment, after the electrically-conductive adhesive 15 is hardened, the optical adhesive is hardened to rigidly bond the deflection element array 2 (3) to the element mounting opening 6A (6B). However, the invention is not limited to the embodiment. For example, the deflection element array 2 (3) is rigidly bonded to the element mounting opening 6A (6B) after the optical adhesive is hardened, and the electrically-conductive adhesive 15 may be hardened.

Figure 7C:
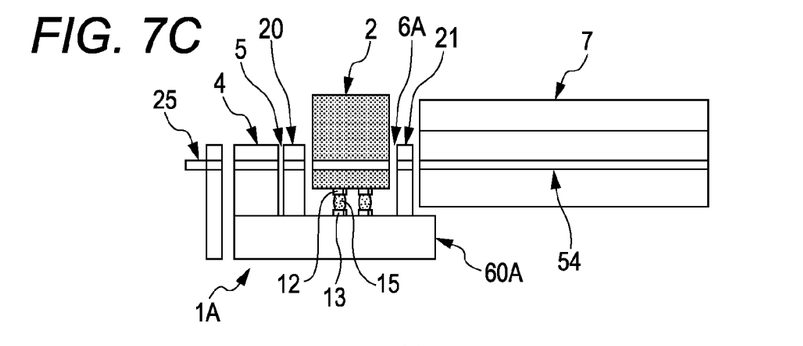
Figure 7D:
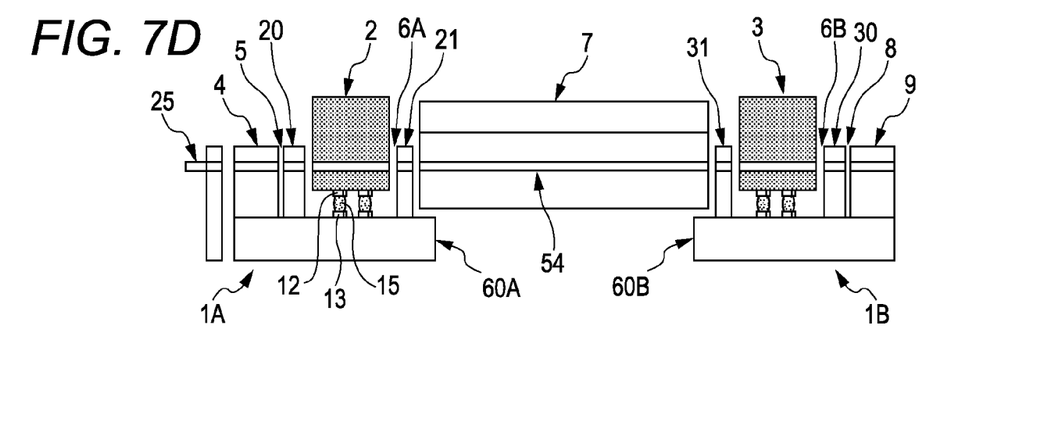

Accordingly, the deflection element array 2 (3) is mounted on the optical waveguide substrate 1A (1B). Thus, after manufacturing the optical waveguide substrates 1A and 1B on which the deflection element arrays 2 and 3 are mounted respectively, the optical waveguide substrates 1A and 1B are coupled to the end faces of the slab optical waveguide substrate 7. In the embodiment, as shown in FIG. 7C, while the end face of the optical waveguide substrate (incident-side optical waveguide substrate) 1A on which the deflection element array 2 is mounted faces one of end faces of the slab optical waveguide 54 of the slab optical waveguide substrate 7, the alignment is performed to couple the end face of the optical waveguide substrate 1A to one of end faces of the slab optical waveguide 54 of the slab optical waveguide substrate 7. Then, as shown in FIG. 7D, while the other end face of the slab optical waveguide 54 of the slab optical waveguide substrate 7 coupled to the end face of the optical waveguide substrate 1A faces the end face of the optical waveguide substrate (outgoing-side optical waveguide substrate) 1B on which the deflection element array 3 is mounted, the alignment is performed to couple the end face of the optical waveguide substrate 1B to the other end face of the slab optical waveguide 54 of the slab optical waveguide substrate 7.

Specifically, as shown in FIG. 7C, the optical waveguide substrate 1A and the slab optical waveguide substrate 7 are disposed on an alignment stage (not shown) such that the end face of the optical waveguide substrate 1A and one of the end faces of the slab optical waveguide 54 of the slab optical waveguide substrate 7 are brought close to each other while facing each other. At this point, the slab optical waveguide substrate 7 is disposed such that the substrate is faced up. Then, the optical waveguide substrate 1A and the slab optical waveguide substrate 7 are aligned with each other.

As shown in FIG. 7C, the alignment light (monitor light) is caused to impinge onto the channel optical waveguide 4 of the optical waveguide substrate 1A through the fiber array 25. The alignment light is outputted from the end face of the slab optical waveguide 21 through the channel optical waveguide 4, the lens array 5, the slab optical waveguide 20, the deflection element array 2, and the slab optical waveguide 21. The outgoing light (optical signal) is incident to one of the end faces of the slab waveguide 54 of the slab optical waveguide substrate 7 and outputted from the other end.

Thus, while the alignment light (outgoing light) which is incident from the channel optical waveguide 4 of the optical waveguide substrate 1A and outputted from the other end face of the slab waveguide 54 of the slab optical waveguide substrate 7 is monitored by the optical power meter or infrared camera, the alignment stage is moved such that the intensity of the outgoing light becomes the maximum (i.e., one of or both the substrate are slid in a lateral direction), and the optical waveguide substrate 1A and the slab optical waveguide substrate 7 are aligned with each other (i.e., active alignment is performed) to determine the position where the optical waveguide substrate 1A and the slab optical waveguide substrate 7 are bonded to each other.

Accordingly, the angle misalignment of the propagation light can be solved by performing the alignment in the lateral direction (horizontal direction) using the alignment stage. The outgoing light can be monitored through the fiber array (not shown) brought close to the end face of the slab waveguide 54 of the slab optical waveguide substrate 7 using the optical power meter, or the outgoing light can be monitored by bringing the optical power meter or infrared camera close to the end face of the slab waveguide 54 of the slab optical waveguide substrate 7.

Then, the gap between the end face of the optical waveguide substrate 1A and one of the end faces of the slab optical waveguide 54 of the slab optical waveguide substrate 7 is filled with the bonding agent (for example, optical adhesive such as GA700H (product of NTT-AT)) such as the ultra-violet curing resin (UV resin) and the thermo-curing resin, and the bonding agent is hardened to rigidly bond (couple) the end face of the optical waveguide substrate 1A and one of the end faces of the slab optical waveguide 54 of the slab optical waveguide substrate 7.

In the embodiment, the gap between the upper surface of the projection 60A of the optical waveguide substrate 1A and the lower surface of one of the end faces of the slab optical waveguide substrate 7 is also filled with the optical adhesive to be rigidly bonded. Then, as shown in FIG. 7D, the slab optical waveguide substrate 7 and the optical waveguide substrate 1B are disposed on the alignment stage (not shown) such that the other end face of the slab optical waveguide 54 of the slab optical waveguide substrate 7 coupled to the end face of the optical waveguide substrate 1A and the end face of the optical waveguide substrate 1B are brought close to each other while facing each other.

Then, the slab optical waveguide substrate 7 coupled to the end face of the optical waveguide substrate 1A is aligned with the optical waveguide substrate 1B. At this point, as shown in FIG. 7D, the alignment light (monitor light) is caused to impinge onto the channel optical waveguide 4 of the optical waveguide substrate 1A through the fiber array 25. The alignment light is outputted from the other end face of the slab optical waveguide 54 of the slab optical waveguide 7 through the channel optical waveguide 4, the lens array 5, the slab optical waveguide 20, the deflection element array 2, the slab optical waveguide 21, and the slab optical waveguide 54 of the slab optical waveguide substrate 7.

The outgoing light (optical signal) is incident from the end face of the slab optical waveguide 31 of the optical waveguide substrate 1B and outputted from the end face of the channel optical waveguide 9 through the deflection element array 3, the slab optical waveguide 30, the lens array 8, and the channel optical waveguide 9. While the alignment light (outgoing light) which is incident from the channel optical waveguide 4 of the optical waveguide substrate 1A and outputted from the channel optical waveguide 9 of the optical waveguide substrate 1B is monitored by the optical power meter or infrared camera, the alignment stage is moved such that the intensity of the outgoing light becomes the maximum (i.e., one of or both the substrates are slid in the lateral direction), and the slab optical waveguide substrate 7 coupled to the optical waveguide substrate 1A and the optical waveguide substrate 1B are aligned with each other (i.e., the active alignment is performed) to determine the position where the slab optical waveguide substrate 7 coupled to the optical waveguide substrate 1A and the optical waveguide substrate 1B are bonded to each other.

Accordingly, the angle misalignment of the propagation light can be solved by performing the alignment in the lateral direction (horizontal direction) using the alignment stage. The outgoing light can be monitored through the fiber array (not shown) brought close to the end face of the channel optical waveguide 9 of the optical waveguide substrate 1B using the optical power meter, or the outgoing light can be monitored by bringing the optical power meter or infrared camera close to the end face of the channel optical waveguide 9 of the optical waveguide substrate 1B.

In the case where the slab optical waveguide substrate 7 to which the optical waveguide substrate 1A is coupled is aligned with the optical waveguide substrate 1B, the slab optical waveguide (second optical waveguide) 31 of the optical waveguide substrate 1B acts as the incident optical waveguide guiding the light incident to the deflection element array 3, and the slab optical waveguide (first optical waveguide) 30 and the channel optical waveguide (first optical waveguide) 9 act as the outgoing optical waveguide guiding the light outgoing from the deflection element array 3.

In the embodiment, in the case where the slab optical waveguide substrate 7 to which the optical waveguide substrate 1A is coupled is aligned with the optical waveguide substrate 1B, the light is incident from the side of the optical waveguide substrate 1A. However, the invention is not limited to the embodiment. Alternatively, the light may be incident from the side of the optical waveguide substrate 1B. Then, the gap between the other end face of the slab optical waveguide 54 of the slab optical waveguide substrate 7 and the end face of the optical waveguide substrate 1B is filled with the bonding agent (for example, optical adhesive such as GA700H (product of NTT-AT) such as the ultra-violet setting resin (UV resin) and the thermo-setting resin, and the bonding agent is hardened to rigidly bond (couple) the other end face of the slab optical waveguide 54 of the slab optical waveguide substrate 7 and the end face of the optical waveguide substrate 1B.

In the embodiment, the gap between the upper surface of the projection 60B of the optical waveguide substrate 1B and the lower surface of the other end face of the slab optical waveguide substrate 7 is also rigidly bonded by the optical adhesive. Then, the fiber arrays are rigidly bonded (coupled) to the end faces of the channel optical waveguides 4 and 9 of the optical waveguide substrates 1A and 1B by the optical adhesive.

In the embodiment, the fiber arrays are rigidly bonded after the optical waveguide substrates 1A and 1B and the slab optical waveguide substrate 7 are rigidly bonded. However, the invention is not limited to the embodiment. For example, the fiber arrays may be rigidly bonded to the optical waveguide substrates 1A and 1B before the optical waveguide substrates 1A and 1B and the slab optical waveguide substrate 7 are rigidly bonded. Accordingly, the optical module and the method of manufacturing the optical module according to the invention, advantageously the active alignment (including inclination adjustment) can be performed correctly and surely to improve the mounting accuracy (alignment accuracy).

Particularly the quality loss caused by the misalignment (mounting misalignment) between the deflection element arrays 2 and 3 can be prevented, because the deflection element arrays 2 and 3 are mounted after performing inclination adjustment in the direction perpendicular to the substrate. Additionally the characteristic deterioration caused by the temporal misalignment in each coupled portion can be prevented because the slab optical waveguide substrate 7 is provided on the projections 60A and 60B of the optical waveguide substrates 1A and 1B. Accordingly, the optical module (optical switch module) having the low propagation loss can be realized in the case where the deflection element arrays 2 and 3 are mounted to prepared the optical module.

The optical module is divided into the optical waveguide substrates 1A and 1B and the slab optical waveguide substrate 7 to decrease the sizes of the optical waveguide substrates 1A and 1B, so that a yield can be improved to reduce production cost. In the optical switch module of the embodiment, the optical waveguide substrates 1A and 1B on which the deflection elements 2 and 3 are mounted are coupled to the end faces of the slab optical waveguide substrate 7 respectively. The invention is not limited to the embodiment, but the invention may be applied to an optical module wherein the optical waveguide substrate on which the deflection element is mounted is coupled to the end face of the slab optical waveguide substrate.

In the embodiment, the projection 60A (60B) is formed by partially removing the end face of the slab optical waveguide 21 (31) of the optical waveguide substrate 1A (1B) by the dry etching such as RIE. However, the invention is not limited to the embodiment. Alternatively, the end face of the slab optical waveguide is not removed but remained, the end face of the slab optical waveguide is formed in cutting the slab optical waveguide in predetermined dimensions, and the optical waveguide substrate may be formed with no projection. In this case, the end face of the slab optical waveguide of the optical waveguide substrate may be polished.

The invention is not limited to the embodiments, but various modifications can be made without departing from the scope of the invention.

What is claimed is:

1. An optical module comprising:
   a first optical waveguide substrate having a first slab optical waveguide and end faces;
   a second optical waveguide substrate which includes a first optical waveguide, a second optical waveguide optically connected to the first slab optical wave guide, and end faces, the second optical waveguide substrate having an opening between the first optical waveguide and the second optical waveguide; and
   a first deflection device which is mounted in the opening and is optically connected to the first slab optical wave guide through the second optical waveguide,
   wherein one of the end faces of the first optical waveguide substrate and one of the end faces of the second optical waveguide substrate are coupled to each other.

2. The optical module according to claim 1, wherein the first deflection device includes a plurality of deflection elements, and each of the deflection elements have an electro-optic effect.

3. The optical module according to claim 1, wherein the second optical waveguide substrate includes a projection projected from one of the end faces of second optical waveguide, and
   the first optical waveguide substrate is provided on the projection.

4. The optical module according to claim 1, further comprising:
   a third optical waveguide substrate which includes a third optical waveguide, a fourth optical waveguide optically connected to the third slab optical wave guide, and end faces, the third optical waveguide substrate having an opening between the third optical waveguide and the fourth optical waveguide;
   a second deflection device which is mounted in the opening of the third optical waveguide and is optically connected to the first slab optical wave guide through the fourth optical waveguide,
   wherein the one of the end faces of the third optical waveguide substrate and other end face of the first optical waveguide substrate are coupled to each other.

5. The optical module according to claim 1, wherein the second optical waveguide substrate differs from the first optical waveguide substrate in a material.

6. The optical module according to claim 1, wherein the first optical waveguide includes plurality of channel optical waveguides and a second slab optical waveguide.

7. The optical module according to claim 6, wherein the first optical waveguide is connected to an optical fiber.

8. The optical module according to claim 1, wherein the second optical waveguide includes a third slab optical waveguide.

9. The optical module according to claim 1, wherein the second optical waveguide substrate includes a lens array.

10. A method of manufacturing an optical module comprising:
    disposing a first deflection device in an opening of a second optical waveguide substrate, the second optical waveguide substrate including a first optical waveguide and a second optical waveguide, the opening is formed between the first optical waveguide and the second optical wave guide;
    performing first alignment between the second optical waveguide substrate and the first deflection device;
    fixing the second optical waveguide substrate and the first deflection device to each other;
    performing second alignment while an end face of a first optical waveguide substrate having a first slab optical waveguide faces an end face of the second optical waveguide substrate on which the first deflection device is mounted; and
    coupling the end face of the first optical waveguide substrate and the end face of the second optical waveguide substrate to each other, wherein
    the second alignment is performed so as to have an optical connection between the second optical waveguide and the first slab optical waveguide.

11. The method of manufacturing an optical module according to claim 10, wherein the first alignment includes:
    entering a light to the first deflection element through the first optical waveguide; and
    monitoring the light outgoing through the second optical waveguide.

12. The method of manufacturing an optical module according to claim 11, wherein the monitoring step is monitoring a intensity of the light.

13. The method of manufacturing an optical module according to claim 10, wherein the second alignment includes:
    entering a light to the first optical waveguide;
    entering the light outgoing through the first deflection device and the second optical waveguide to one of end faces of the first optical waveguide substrate; and
    monitoring the light outgoing from the other end face of the first optical waveguide substrate.

14. The method of manufacturing an optical module according to claim 11, further comprising:
    disposing a second deflection device in an opening of a third optical waveguide substrate, the third optical waveguide substrate including a third optical waveguide and a fourth optical waveguide, the opening of the third optical waveguide substrate is formed between the third optical waveguide and the fourth optical waveguide;
    performing a third alignment between the third optical waveguide substrate and the second deflection device;
    fixing the third optical waveguide substrate and the second deflection device to each other;
    performing a fourth alignment while the other end face of the first optical waveguide substrate faces an end face of the third optical waveguide substrate on which the second deflection device is mounted; and coupling the other end face of the first optical waveguide substrate and the end face of the third optical waveguide substrate to each other, wherein the forth alignment is performed so as to have an optical connection between the third optical waveguide and the first slab optical waveguide.

15. The method of manufacturing an optical module according to claim 14, wherein the third alignment includes:

entering a light to the second deflection element through the third optical waveguide; and monitoring the light outgoing through the fourth optical waveguide.

16. The method of manufacturing an optical module according to claim 15, wherein the monitoring step is monitoring a intensity of the light.

17. The method of manufacturing an optical module according to claim 13, wherein the fourth alignment includes:

entering the light to the first optical waveguide of the second optical waveguide substrate;

entering the light outgoing through the first deflection device and the second optical waveguide to one of end faces of the first optical waveguide substrate;

entering the light outgoing from the other end face of the first optical wave guide substrate to the third optical waveguide of the third optical waveguide substrate; and monitoring the light outgoing from the fourth optical waveguide.

18. A method of aligning an optical module comprising:

disposing a deflection element in an opening of a second optical waveguide substrate, the second optical waveguide substrate including a first optical waveguide and a second optical waveguide, the opening is formed between the first optical waveguide and the second optical waveguide;

entering a light to the deflection device through the first optical waveguide;

monitoring the light outgoing through the second optical waveguide;

adjusting a position of the deflection device according to intensity of the outgoing light;

facing an end face of the second optical wave guide substrate and an end face of a first optical waveguide substrate having a first slab waveguide to each other;

entering the light to the first optical waveguide;

entering the light outgoing through the deflection device and the second optical waveguide to one of end faces of the first slab waveguide of the first optical waveguide subsrate;

monitoring the light outgoing from the other end face of the first slab waveguide of the first optical waveguide substrate; and adjusting a position of the first optical waveguide substrate and the second optical waveguide substrate according to intensity of the light.

* * * * *